(12) United States Patent
Chandrasekaran

(10) Patent No.: US 8,502,520 B2
(45) Date of Patent: *Aug. 6, 2013

(54) ISOLATED POWER CONVERTER

(75) Inventor: Sriram Chandrasekaran, Round Rock, TX (US)

(73) Assignee: Flextronics International USA, Inc, San Jose, CA (US)

(*) Notice: Subject to any disclaimer, the term of this patent is extended or adjusted under 35 U.S.C. 154(b) by 168 days.

This patent is subject to a terminal disclaimer.

(21) Appl. No.: 12/341,804

(22) Filed: Dec. 22, 2008

(65) Prior Publication Data

US 2009/0097290 A1    Apr. 16, 2009

Related U.S. Application Data

(63) Continuation of application No. 11/686,140, filed on Mar. 14, 2007, now Pat. No. 7,468,649.

(51) Int. Cl.
*H01F 27/28* (2006.01)
*H02M 7/00* (2006.01)

(52) U.S. Cl.
USPC ........... 323/362; 323/250; 323/262; 336/180; 336/182; 336/212; 363/125

(58) Field of Classification Search
USPC ............ 336/170, 180, 182, 212, 214, 215, 336/216, 221, 222, 233; 323/250, 251, 262, 323/331, 332, 334, 355, 359, 362; 363/125, 363/126, 127, 89
See application file for complete search history.

(56) References Cited

U.S. PATENT DOCUMENTS

| 1,376,978 A | 5/1921 | Stoekle |
| 2,473,662 A | 6/1949 | Pohm |

(Continued)

FOREIGN PATENT DOCUMENTS

| CN | 101141099 | 3/2008 |
| CN | 201252294 | 6/2009 |

(Continued)

OTHER PUBLICATIONS

Chen, W., et al., "Integrated Planar Inductor Scheme for Multi-module Interleaved Quasi-Square-Wave (QSW) DC/DC Converter," 30th Annual IEEE Power Electronics Specialists Conference (PESC '99), 1999, pp. 759-762, vol. 2, IEEE, Los Alamitos, CA.

(Continued)

*Primary Examiner* — Gary L Laxton
(74) *Attorney, Agent, or Firm* — Boisbrun Hofman, PLLC

(57) ABSTRACT

An isolated power converter that includes, in one embodiment, a first magnetic core having a primary winding and a secondary winding around the first magnetic core. The power converter includes a second magnetic core having a first leg, a second leg coupled to the first leg, and a third leg coupled to the first and second legs, wherein a part of the third leg is equidistant from the first leg and the second leg. The power converter also includes a first winding encircling the first leg, a first end of the first winding coupled to the secondary winding, a second winding encircling the second leg, a first end of the second winding coupled to the secondary winding, and a third winding encircling the third leg, a first end of the third winding coupled to a second end of the first winding and to a second end of the second winding.

20 Claims, 8 Drawing Sheets

U.S. PATENT DOCUMENTS

| | | |
|---|---|---|
| 3,007,060 A | 10/1961 | Guenther |
| 3,346,798 A | 10/1967 | Dinger |
| 3,358,210 A | 12/1967 | Grossoehme |
| 3,433,998 A | 3/1969 | Woelber |
| 3,484,562 A | 12/1969 | Kronfeld |
| 3,553,620 A | 1/1971 | Cielo et al. |
| 3,602,795 A | 8/1971 | Gunn |
| 3,622,868 A | 11/1971 | Todt |
| 3,681,679 A | 8/1972 | Chung |
| 3,708,742 A | 1/1973 | Gunn |
| 3,708,744 A | 1/1973 | Stephens et al. |
| 4,019,122 A | 4/1977 | Ryan |
| 4,075,547 A | 2/1978 | Wroblewski |
| 4,202,031 A * | 5/1980 | Hesler et al. .................. 363/97 |
| 4,257,087 A | 3/1981 | Cuk |
| 4,274,071 A * | 6/1981 | Pfarre .......................... 336/12 |
| 4,327,348 A | 4/1982 | Hirayama |
| 4,471,423 A | 9/1984 | Hase |
| 4,499,481 A | 2/1985 | Greene |
| 4,570,174 A | 2/1986 | Huang et al. |
| 4,577,268 A | 3/1986 | Easter et al. |
| 4,581,691 A | 4/1986 | Hock |
| 4,613,841 A * | 9/1986 | Roberts ........................ 336/83 |
| 4,636,823 A | 1/1987 | Margalit et al. |
| 4,660,136 A | 4/1987 | Montorefano |
| 4,770,667 A | 9/1988 | Evans et al. |
| 4,770,668 A | 9/1988 | Skoultchi et al. |
| 4,785,387 A | 11/1988 | Lee et al. |
| 4,799,138 A | 1/1989 | Chahabadi et al. |
| 4,803,609 A | 2/1989 | Gillett et al. |
| 4,823,249 A | 4/1989 | Garcia, II |
| 4,837,496 A | 6/1989 | Erdi |
| 4,853,668 A * | 8/1989 | Bloom ......................... 336/214 |
| 4,866,367 A | 9/1989 | Ridley et al. |
| 4,876,638 A * | 10/1989 | Silva et al. ..................... 363/97 |
| 4,887,061 A | 12/1989 | Matsumura |
| 4,899,271 A | 2/1990 | Seiersen |
| 4,903,089 A | 2/1990 | Hollis et al. |
| 4,922,400 A | 5/1990 | Cook |
| 4,962,354 A | 10/1990 | Visser et al. |
| 4,964,028 A | 10/1990 | Spataro |
| 4,999,759 A | 3/1991 | Cavagnolo et al. |
| 5,003,277 A | 3/1991 | Sokai et al. |
| 5,014,178 A | 5/1991 | Balakrishnan |
| 5,027,264 A | 6/1991 | DeDoncker et al. |
| 5,068,756 A | 11/1991 | Morris et al. |
| 5,106,778 A | 4/1992 | Hollis et al. |
| 5,126,714 A | 6/1992 | Johnson |
| 5,132,888 A | 7/1992 | Lo et al. |
| 5,134,771 A | 8/1992 | Lee et al. |
| 5,172,309 A | 12/1992 | DeDoncker et al. |
| 5,177,460 A | 1/1993 | Dhyanchand et al. |
| 5,182,535 A | 1/1993 | Dhyanchand |
| 5,204,809 A | 4/1993 | Andresen |
| 5,206,621 A | 4/1993 | Yerman |
| 5,208,739 A | 5/1993 | Sturgeon |
| 5,223,449 A | 6/1993 | Morris et al. |
| 5,225,971 A * | 7/1993 | Spreen .......................... 363/17 |
| 5,231,037 A | 7/1993 | Yuan et al. |
| 5,244,829 A | 9/1993 | Kim |
| 5,262,930 A | 11/1993 | Hua et al. |
| 5,282,126 A | 1/1994 | Husgen |
| 5,285,396 A | 2/1994 | Aoyama |
| 5,291,382 A | 3/1994 | Cohen |
| 5,303,138 A | 4/1994 | Rozman |
| 5,305,191 A | 4/1994 | Loftus, Jr. |
| 5,335,163 A * | 8/1994 | Seiersen ....................... 336/212 |
| 5,336,985 A | 8/1994 | McKenzie |
| 5,342,795 A | 8/1994 | Yuan et al. |
| 5,343,140 A | 8/1994 | Gegner |
| 5,353,001 A | 10/1994 | Meinel et al. |
| 5,369,042 A | 11/1994 | Morris et al. |
| 5,374,887 A | 12/1994 | Drobnik |
| 5,399,968 A | 3/1995 | Sheppard et al. |
| 5,407,842 A | 4/1995 | Morris et al. |
| 5,450,307 A * | 9/1995 | Yasumura ....................... 363/47 |
| 5,459,652 A | 10/1995 | Faulk |
| 5,468,661 A | 11/1995 | Yuan et al. |
| 5,477,175 A | 12/1995 | Tisinger et al. |
| 5,508,903 A | 4/1996 | Alexndrov |
| 5,523,673 A * | 6/1996 | Ratliff et al. .................. 323/206 |
| 5,539,630 A | 7/1996 | Pietkiewicz et al. |
| 5,554,561 A | 9/1996 | Plumton |
| 5,555,494 A | 9/1996 | Morris |
| 5,610,085 A | 3/1997 | Yuan et al. |
| 5,624,860 A | 4/1997 | Plumton et al. |
| 5,663,876 A | 9/1997 | Newton et al. |
| 5,700,703 A | 12/1997 | Huang et al. |
| 5,712,189 A | 1/1998 | Plumton et al. |
| 5,719,544 A | 2/1998 | Vinciarelli et al. |
| 5,734,564 A | 3/1998 | Brkovic |
| 5,736,842 A | 4/1998 | Jovanovic |
| 5,742,491 A | 4/1998 | Bowman et al. |
| 5,747,842 A | 5/1998 | Plumton |
| 5,756,375 A | 5/1998 | Celii et al. |
| 5,760,671 A | 6/1998 | Lahr et al. |
| 5,783,984 A | 7/1998 | Keuneke |
| 5,784,266 A | 7/1998 | Chen |
| 5,804,943 A | 9/1998 | Kollman et al. |
| 5,815,383 A | 9/1998 | Lei |
| 5,815,386 A | 9/1998 | Gordon |
| 5,864,110 A | 1/1999 | Moriguchi et al. |
| 5,870,299 A | 2/1999 | Rozman |
| 5,880,942 A | 3/1999 | Leu |
| 5,886,508 A | 3/1999 | Jutras |
| 5,889,298 A | 3/1999 | Plumton et al. |
| 5,889,660 A | 3/1999 | Taranowski et al. |
| 5,900,822 A | 5/1999 | Sand et al. |
| 5,907,481 A | 5/1999 | Svärdsjö |
| 5,909,110 A | 6/1999 | Yuan et al. |
| 5,910,665 A | 6/1999 | Plumton et al. |
| 5,920,475 A | 7/1999 | Boylan et al. |
| 5,925,088 A | 7/1999 | Nasu |
| 5,929,665 A | 7/1999 | Ichikawa et al. |
| 5,933,338 A | 8/1999 | Wallace |
| 5,940,287 A | 8/1999 | Brkovic |
| 5,946,207 A | 8/1999 | Schoofs |
| 5,956,245 A | 9/1999 | Rozman |
| 5,956,578 A | 9/1999 | Weitzel et al. |
| 5,959,850 A | 9/1999 | Lim |
| 5,977,853 A | 11/1999 | Ooi et al. |
| 5,999,066 A | 12/1999 | Saito et al. |
| 5,999,429 A | 12/1999 | Brown |
| 6,003,139 A | 12/1999 | McKenzie |
| 6,008,519 A | 12/1999 | Yuan et al. |
| 6,011,703 A | 1/2000 | Boylan et al. |
| 6,038,154 A | 3/2000 | Boylan et al. |
| 6,046,664 A * | 4/2000 | Weller et al. .................. 336/212 |
| 6,055,166 A | 4/2000 | Jacobs et al. |
| 6,060,943 A | 5/2000 | Jansen |
| 6,067,237 A | 5/2000 | Nguyen |
| 6,069,798 A | 5/2000 | Liu |
| 6,069,799 A | 5/2000 | Bowman et al. |
| 6,078,510 A | 6/2000 | Spampinato et al. |
| 6,084,792 A | 7/2000 | Chen et al. |
| 6,094,038 A | 7/2000 | Lethellier |
| 6,097,046 A | 8/2000 | Plumton |
| 6,125,046 A | 9/2000 | Jang et al. |
| 6,144,187 A | 11/2000 | Bryson |
| 6,147,886 A | 11/2000 | Wittenbreder |
| 6,156,611 A | 12/2000 | Lan et al. |
| 6,160,721 A | 12/2000 | Kossives et al. |
| 6,163,466 A | 12/2000 | Davila, Jr. et al. |
| 6,181,231 B1 | 1/2001 | Bartilson |
| 6,188,586 B1 | 2/2001 | Farrington et al. |
| 6,191,964 B1 | 2/2001 | Boylan et al. |
| 6,208,535 B1 | 3/2001 | Parks |
| 6,215,290 B1 | 4/2001 | Yang et al. |
| 6,218,891 B1 | 4/2001 | Lotfi et al. |
| 6,229,197 B1 | 5/2001 | Plumton et al. |
| 6,262,564 B1 | 7/2001 | Kanamori |
| 6,288,501 B1 | 9/2001 | Nakamura et al. |
| 6,288,920 B1 | 9/2001 | Jacobs et al. |
| 6,295,217 B1 | 9/2001 | Yang et al. |
| 6,304,460 B1 | 10/2001 | Cuk |
| 6,309,918 B1 | 10/2001 | Huang et al. |
| 6,317,021 B1 * | 11/2001 | Jansen .......................... 336/155 |

| | | | | | | |
|---|---|---|---|---|---|---|
| 6,317,337 B1 | 11/2001 | Yasumura | | 7,098,640 B2 | 8/2006 | Brown |
| 6,320,490 B1 | 11/2001 | Clayton | | 7,099,163 B1 | 8/2006 | Ying |
| 6,323,090 B1 | 11/2001 | Zommer | | 7,136,293 B2 * | 11/2006 | Petkov et al. ............... 363/126 |
| 6,325,035 B1 | 12/2001 | Codina et al. | | 7,148,669 B2 | 12/2006 | Maksimovic et al. |
| 6,344,986 B1 | 2/2002 | Jain et al. | | 7,170,268 B2 | 1/2007 | Kim |
| 6,345,364 B1 | 2/2002 | Lee | | 7,176,662 B2 | 2/2007 | Chandrasekaran |
| 6,348,848 B1 | 2/2002 | Herbert | | 7,209,024 B2 * | 4/2007 | Nakahori ................... 336/170 |
| 6,351,396 B1 | 2/2002 | Jacobs | | 7,269,038 B2 | 9/2007 | Shekhawat et al. |
| 6,356,462 B1 | 3/2002 | Jang et al. | | 7,280,026 B2 | 10/2007 | Chandrasekaran et al. |
| 6,362,986 B1 | 3/2002 | Schultz et al. | | 7,285,807 B2 | 10/2007 | Brar et al. |
| 6,373,727 B1 | 4/2002 | Hedenskog et al. | | 7,298,118 B2 | 11/2007 | Chandrasekaran |
| 6,373,734 B1 | 4/2002 | Martinelli | | 7,301,785 B2 | 11/2007 | Yasumura |
| 6,380,836 B2 | 4/2002 | Matsumoto et al. | | 7,321,283 B2 | 1/2008 | Mehrotra et al. |
| 6,388,898 B1 | 5/2002 | Fan et al. | | 7,332,992 B2 | 2/2008 | Iwai |
| 6,392,902 B1 | 5/2002 | Jang et al. | | 7,339,208 B2 | 3/2008 | Brar et al. |
| 6,400,579 B2 | 6/2002 | Cuk | | 7,339,801 B2 | 3/2008 | Yasumura |
| 6,414,578 B1 | 7/2002 | Jitaru | | 7,348,612 B2 | 3/2008 | Sriram et al. |
| 6,438,009 B2 | 8/2002 | Assow | | 7,360,004 B2 | 4/2008 | Dougherty et al. |
| 6,462,965 B1 | 10/2002 | Uesono | | 7,362,592 B2 | 4/2008 | Yang et al. |
| 6,466,461 B2 | 10/2002 | Mao et al. | | 7,362,593 B2 | 4/2008 | Yang et al. |
| 6,469,564 B1 | 10/2002 | Jansen | | 7,385,375 B2 | 6/2008 | Rozman |
| 6,477,065 B2 | 11/2002 | Parks | | 7,386,404 B2 | 6/2008 | Cargonja et al. |
| 6,483,724 B1 | 11/2002 | Blair et al. | | 7,417,875 B2 | 8/2008 | Chandrasekaran et al. |
| 6,489,754 B2 | 12/2002 | Blom | | 7,427,910 B2 | 9/2008 | Mehrotra et al. |
| 6,498,367 B1 | 12/2002 | Chang et al. | | 7,446,512 B2 | 11/2008 | Nishihara et al. |
| 6,501,193 B1 | 12/2002 | Krugly | | 7,447,049 B2 | 11/2008 | Garner et al. |
| 6,504,321 B2 | 1/2003 | Giannopoulos et al. | | 7,468,649 B2 * | 12/2008 | Chandrasekaran .......... 336/212 |
| 6,512,352 B2 | 1/2003 | Qian | | 7,471,523 B2 | 12/2008 | Yang |
| 6,525,603 B1 | 2/2003 | Morgan | | 7,489,225 B2 | 2/2009 | Dadafshar |
| 6,539,299 B2 | 3/2003 | Chatfield et al. | | 7,499,295 B2 | 3/2009 | Indika de Silva et al. |
| 6,545,453 B2 | 4/2003 | Glinkowski et al. | | 7,554,430 B2 | 6/2009 | Mehrotra et al. |
| 6,548,992 B1 | 4/2003 | Alcantar et al. | | 7,558,037 B1 | 7/2009 | Gong et al. |
| 6,549,436 B1 | 4/2003 | Sun | | 7,558,082 B2 | 7/2009 | Jitaru |
| 6,552,917 B1 | 4/2003 | Bourdillon | | 7,567,445 B2 | 7/2009 | Coulson et al. |
| 6,563,725 B2 | 5/2003 | Carsten | | 7,633,369 B2 | 12/2009 | Chandrasekaran et al. |
| 6,570,268 B1 | 5/2003 | Perry et al. | | 7,663,183 B2 | 2/2010 | Brar et al. |
| 6,580,627 B2 | 6/2003 | Takahashi | | 7,667,986 B2 | 2/2010 | Artusi et al. |
| 6,597,592 B2 | 7/2003 | Carsten | | 7,675,758 B2 | 3/2010 | Artusi et al. |
| 6,608,768 B2 | 8/2003 | Sula | | 7,675,759 B2 | 3/2010 | Artusi et al. |
| 6,611,132 B2 | 8/2003 | Nakagawa et al. | | 7,675,764 B2 | 3/2010 | Chandrasekaran et al. |
| 6,614,206 B1 | 9/2003 | Wong et al. | | 7,715,217 B2 | 5/2010 | Manabe et al. |
| 6,654,259 B2 * | 11/2003 | Koshita et al. ............. 363/21.03 | | 7,733,679 B2 | 6/2010 | Luger et al. |
| 6,661,276 B1 | 12/2003 | Chang | | 7,746,041 B2 | 6/2010 | Xu et al. |
| 6,668,296 B1 | 12/2003 | Dougherty et al. | | 7,778,050 B2 | 8/2010 | Yamashita |
| 6,674,658 B2 | 1/2004 | Mao et al. | | 7,778,051 B2 | 8/2010 | Yang |
| 6,683,797 B2 | 1/2004 | Zaitsu et al. | | 7,787,264 B2 | 8/2010 | Yang et al. |
| 6,687,137 B1 | 2/2004 | Yasumura | | 7,791,903 B2 | 9/2010 | Zhang et al. |
| 6,696,910 B2 | 2/2004 | Nuytkens et al. | | 7,795,849 B2 | 9/2010 | Sohma |
| 6,731,486 B2 | 5/2004 | Holt et al. | | 7,813,101 B2 | 10/2010 | Morikawa |
| 6,741,099 B1 | 5/2004 | Krugly | | 7,847,535 B2 * | 12/2010 | Meynard et al. ............... 323/361 |
| 6,753,723 B2 | 6/2004 | Zhang | | 7,889,517 B2 | 2/2011 | Artusi et al. |
| 6,765,810 B2 | 7/2004 | Perry | | 7,889,521 B2 | 2/2011 | Hsu |
| 6,775,159 B2 | 8/2004 | Webb et al. | | 7,906,941 B2 | 3/2011 | Jayaraman et al. |
| 6,784,644 B2 | 8/2004 | Xu et al. | | 7,940,035 B2 | 5/2011 | Yang |
| 6,804,125 B2 | 10/2004 | Brkovic | | 7,965,528 B2 | 6/2011 | Yang et al. |
| 6,813,170 B2 | 11/2004 | Yang | | 8,179,699 B2 | 5/2012 | Tumminaro et al. |
| 6,831,847 B2 | 12/2004 | Perry | | 2002/0057080 A1 | 5/2002 | Telefus et al. |
| 6,856,149 B2 | 2/2005 | Yang | | 2002/0114172 A1 | 8/2002 | Webb et al. |
| 6,862,194 B2 | 3/2005 | Yang et al. | | 2003/0026115 A1 | 2/2003 | Miyazaki |
| 6,867,678 B2 | 3/2005 | Yang | | 2003/0197585 A1 | 10/2003 | Chandrasekaran et al. |
| 6,867,986 B2 | 3/2005 | Amei | | 2003/0198067 A1 | 10/2003 | Sun et al. |
| 6,873,237 B2 | 3/2005 | Chandrasekaran et al. | | 2004/0017689 A1 | 1/2004 | Zhang et al. |
| 6,882,548 B1 | 4/2005 | Jacobs et al. | | 2004/0034555 A1 | 2/2004 | Dismukes et al. |
| 6,906,934 B2 | 6/2005 | Yang et al. | | 2004/0148047 A1 | 7/2004 | Dismukes et al. |
| 6,943,553 B2 | 9/2005 | Zimmermann et al. | | 2004/0156220 A1 | 8/2004 | Kim et al. |
| 6,944,033 B1 | 9/2005 | Xu et al. | | 2004/0200631 A1 | 10/2004 | Chen |
| 6,977,824 B1 | 12/2005 | Yang et al. | | 2004/0217794 A1 | 11/2004 | Strysko |
| 6,980,077 B1 | 12/2005 | Chandrasekaran et al. | | 2005/0024179 A1 | 2/2005 | Chandrasekaran et al. |
| 6,982,887 B2 | 1/2006 | Batarseh et al. | | 2005/0245658 A1 | 11/2005 | Mehrotra et al. |
| 7,009,486 B1 | 3/2006 | Goeke et al. | | 2005/0281058 A1 | 12/2005 | Batarseh et al. |
| 7,012,414 B1 | 3/2006 | Mehrotra et al. | | 2006/0006976 A1 | 1/2006 | Bruno |
| 7,016,204 B2 | 3/2006 | Yang et al. | | 2006/0038549 A1 | 2/2006 | Mehrotra et al. |
| 7,026,807 B2 | 4/2006 | Anderson et al. | | 2006/0038649 A1 | 2/2006 | Mehrotra et al. |
| 7,034,586 B2 | 4/2006 | Mehas et al. | | 2006/0038650 A1 | 2/2006 | Mehrotra et al. |
| 7,034,647 B2 | 4/2006 | Yan et al. | | 2006/0109698 A1 | 5/2006 | Qu |
| 7,046,523 B2 | 5/2006 | Sun et al. | | 2006/0187684 A1 | 8/2006 | Chandrasekaran et al. |
| 7,061,358 B1 | 6/2006 | Yang | | 2006/0197510 A1 | 9/2006 | Chandrasekaran |
| 7,076,360 B1 | 7/2006 | Ma | | 2006/0198173 A1 | 9/2006 | Rozman |
| 7,095,638 B2 | 8/2006 | Uusitalo | | 2006/0226477 A1 | 10/2006 | Brar et al. |

| | | | |
|---|---|---|---|
| 2006/0226478 | A1 | 10/2006 | Brar et al. |
| 2006/0237968 | A1 | 10/2006 | Chandrasekaran |
| 2006/0255360 | A1 | 11/2006 | Brar et al. |
| 2007/0007945 | A1 | 1/2007 | King et al. |
| 2007/0045765 | A1 | 3/2007 | Brar et al. |
| 2007/0069286 | A1 | 3/2007 | Brar et al. |
| 2007/0114979 | A1 | 5/2007 | Chandrasekaran |
| 2007/0120953 | A1 | 5/2007 | Koga et al. |
| 2007/0121351 | A1 | 5/2007 | Zhang et al. |
| 2007/0159857 | A1 | 7/2007 | Lee |
| 2007/0222463 | A1 | 9/2007 | Qahouq et al. |
| 2007/0241721 | A1 | 10/2007 | Weinstein et al. |
| 2007/0296028 | A1 | 12/2007 | Brar et al. |
| 2007/0298559 | A1 | 12/2007 | Brar et al. |
| 2007/0298564 | A1 | 12/2007 | Brar et al. |
| 2008/0024259 | A1 | 1/2008 | Chandrasekaran et al. |
| 2008/0054874 | A1 | 3/2008 | Chandrasekaran et al. |
| 2008/0111657 | A1 | 5/2008 | Mehrotra et al. |
| 2008/0130321 | A1 | 6/2008 | Artusi et al. |
| 2008/0130322 | A1 | 6/2008 | Artusi et al. |
| 2008/0137381 | A1 | 6/2008 | Beasley |
| 2008/0150666 | A1 | 6/2008 | Chandrasekaran et al. |
| 2008/0205104 | A1 | 8/2008 | Lev et al. |
| 2008/0232141 | A1 | 9/2008 | Artusi et al. |
| 2008/0298106 | A1 | 12/2008 | Tataeishi |
| 2008/0310190 | A1 | 12/2008 | Chandrasekaran et al. |
| 2008/0315852 | A1 | 12/2008 | Jayaraman et al. |
| 2008/0316779 | A1 | 12/2008 | Jayaraman et al. |
| 2009/0027926 | A1 | 1/2009 | Yang et al. |
| 2009/0046486 | A1 | 2/2009 | Lu et al. |
| 2009/0109711 | A1 | 4/2009 | Hsu |
| 2009/0257250 | A1 | 10/2009 | Liu |
| 2009/0273957 | A1 | 11/2009 | Feldtkeller |
| 2009/0284994 | A1 | 11/2009 | Lin et al. |
| 2009/0315530 | A1 | 12/2009 | Baranwal |
| 2010/0091522 | A1 | 4/2010 | Chandrasekaran et al. |
| 2010/0123486 | A1 | 5/2010 | Berghegger |
| 2010/0149838 | A1 | 6/2010 | Artusi et al. |
| 2010/0182806 | A1 | 7/2010 | Garrity et al. |
| 2010/0188876 | A1 | 7/2010 | Garrity et al. |
| 2010/0254168 | A1 | 10/2010 | Chandrasekaran |
| 2010/0321958 | A1 | 12/2010 | Brinlee et al. |
| 2010/0321964 | A1 | 12/2010 | Brinlee et al. |
| 2011/0038179 | A1 | 2/2011 | Zhang |
| 2011/0134664 | A1 | 6/2011 | Berghegger |
| 2011/0149607 | A1 | 6/2011 | Jungreis et al. |
| 2011/0182089 | A1 | 7/2011 | Berghegger |
| 2011/0239008 | A1 | 9/2011 | Lam et al. |
| 2011/0305047 | A1 | 12/2011 | Jungreis et al. |
| 2012/0243271 | A1 | 9/2012 | Berghegger |
| 2012/0294048 | A1 | 11/2012 | Brinlee |

FOREIGN PATENT DOCUMENTS

| | | |
|---|---|---|
| EP | 0 665 634 A1 | 1/1994 |
| JP | 57097361 | 6/1982 |
| JP | 3-215911 | 9/1991 |
| JP | 2000-68132 | 3/2000 |
| WO | WO8700991 | 2/1987 |
| WO | WO 2010/083511 A1 | 7/2010 |
| WO | WO 2010/083514 A1 | 7/2010 |
| WO | WO 2010/114914 A1 | 10/2010 |
| WO | WO 2011/116225 A1 | 9/2011 |

OTHER PUBLICATIONS

Lenk, R., "Introduction to the Tapped Buck Converter," PCIM 2000, HFPC 2000 Proceedings, Oct. 2000, pp. 155-166.
Maksimović, D., et al., "Switching Converters with Wide DC Conversion Range," IEEE Transactions on Power Electronics, Jan. 1991, pp. 151-157, vol. 6, No. 1, IEEE, Los Alamitos, CA.
Middlebrook, R.D., "Transformerless DC-to-DC Converters with Large Conversion Ratios," IEEE Transactions on Power Electronics, Oct. 1988, pp. 484-488, vol. 3, No. 4, IEEE, Los Alamitos, CA.
Pietkiewicz, A., et al. "Coupled-Inductor Current-Doubler Topology in Phase-Shifted Full-Bridge DC-DC Converter," 20th International Telecommunications Energy Conference (INTELEC), Oct. 1998, pp. 41-48, IEEE, Los Alamitos, CA.
Rico, M., et al., "Static and Dynamic Modeling of Tapped-Inductor DC-to-DC Converters," 1987, pp. 281-288, IEEE, Los Alamitos, CA.
Wei, J., et al., "Comparison of Three Topology Candidates for 12V VRM," IEEE APEC, 2001, pp. 245-251, IEEE, Los Alamitos, CA.
Wong, P.-L., et al., "Investigating Coupling Inductors in the Interleaving QSW VRM," 15th Annual Applied Power Electronics Conference and Exposition (APEC 2000), Feb. 2000, pp. 973-978, vol. 2, IEEE, Los Alamitos, CA.
Xu, P., et al., "Design and Performance Evaluation of Multi-Channel Interleaved Quasi-Square-Wave Buck Voltage Regulator Module," HFPC 2000 Proceedings, Oct. 2000, pp. 82-88.
"AN100: Application Note using Lx100 Family of High Performance N-Ch JFET Transistors," AN100.Rev 1.01, Sep. 2003, 5 pp., Lovoltech, Inc., Santa Clara, CA.
"AN101A: Gate Drive Network for a Power JFET," AN101A.Rev 1.2, Nov. 2003, 2 pp., Lovoltech, Inc., Santa Clara, CA.
"AN108: Applications Note: How to Use Power JFETs® and MOSFETs Interchangeably in Low-Side Applications," Rev. 1.0.1, Feb. 14, 2005, 4 pp., Lovoltech, Inc., Santa Clara, CA.
Ajram, S., et al., "Ultrahigh Frequency DC-to-DC Converters Using GaAs Power Switches," IEEE Transactions on Power Electronics, Sep. 2001, pp. 594-602, vol. 16, No. 5, IEEE, Los Alamitos, CA.
Balogh, L., et al., "Power-Factor Correction with Interleaved Boost Converters in Continuous-Inductor-Current Mode," IEEE Proceedings of APEC, pp. 168-174, 1993, IEEE, Los Alamitos, CA.
Biernacki, J., et al., "Radio Frequency DC-DC Flyback Converter," Proceedings of the 43rd IEEE Midwest Symposium on Circuits and Systems, Aug. 8-11, 2000, pp. 94-97, vol. 1, IEEE, Los Alamitos, CA.
Chen, W., et al., "Design of High Efficiency, Low Profile, Low Voltage Converter with Integrated Magnetics," Proceedings of 1997 IEEE Applied Power Electronics Conference (APEC '97), 1997, pp. 911-917, IEEE, Los Alamitos, CA.
Chhawchharia, P., et al., "On the Reduction of Component Count in Switched Capacitor DC/DC Convertors," Hong Kong Polytechnic University, IEEE, 1997, Hung Hom, Kowloon, Hong King, pp. 1395-1401.
Curtis, K., "Advances in Microcontroller Peripherals Facilitate Current-Mode for Digital Power Supplies," Digital Power Forum '06, 4 pp., Sep. 2006, Darnell Group, Richardson, TX.
Eisenbeiser, K., et al., "Manufacturable GaAs VFET for Power Switching Applications," IEEE Electron Device Letters, Apr. 2000, pp. 144-145, vol. 21, No. 4, IEEE.
Freescale Semiconductor, "Implementing a Digital AC/DC Switched-Mode Power Supply using a 56F8300 Digital Signal Controller," Application Note AN3115, Aug. 2005, 24 pp., Chandler, AZ.
Gaye, M., et al., "A 50-100MHz 5V to -5V, 1W Cuk Converter Using Gallium Arsenide Power Switches," ISCAS 2000—IEEE International Symposium on Circuits and Systems, May 28-31, 2000, pp. I-264-I-267, vol. 1, IEEE, Geneva, Switzerland.
Goldberg, A.F., et al., "Finite-Element Analysis of Copper Loss in 1-10-MHz Transformers," IEEE Transactions on Power Electronics, Apr. 1989, pp. 157-167, vol. 4, No. 2, IEEE, Los Alamitos, CA.
Goldberg, A.F., et al., "Issues Related to 1-10-MHz Transformer Design," IEEE Transactions on Power Electronics, Jan. 1989, pp. 113-123, vol. 4, No. 1, IEEE, Los Alamitos, CA.
Jitaru, I.D., et al., "Quasi-Integrated Magnetic an Avenue for Higher Power Density and Efficiency in Power Converters," 12th Annual Applied Power Electronics Conference and Exposition, Feb. 23-27, 1997, pp. 395-402, vol. 1, IEEE, Los Alamitos, CA.
Kollman, R., et al., "10 MHz PWM Converters with GaAs VFETs," IEEE 11th Annual Applied Power Electronics Conference and Exposition, Mar. 1996, pp. 264-269, vol. 1, IEEE.
Kuwabara, K., et al., "Switched-Capacitor DC—DC Converters," Fujitsu Limited, IEEE, 1988, Kawasaki, Japan, pp. 213-218.
Lee, P.-W., et al., "Steady-State Analysis of an Interleaved Boost Converter with Coupled Inductors," IEEE Transactions on Industrial Electronics, Aug. 2000, pp. 787-795, vol. 47, No. 4, IEEE, Los Alamitos, CA.
Liu, W., "Fundamentals of III-V Devices: HBTs, MESFETs, and HFETs/HEMTs," §5-5: Modulation Doping, 1999, pp. 323-330, John Wiley & Sons, New York, NY.
Maxim, Application Note 725, www.maxim-ic.com/an725, Maxim Integrated Products, Nov. 29, 2001, 8 pages.

Miwa, B.A., et al., "High Efficiency Power Factor Correction Using Interleaving Techniques," IEEE Proceedings of APEC, 1992, pp. 557-568, IEEE, Los Alamitos, CA.

National Semiconductor Corporation, "LM2665 Switched Capacitor Voltage Converter," www.national.com, Sep. 2005, 9 pages.

National Semiconductor Corporation, "LMC7660 Switched Capacitor Voltage Converter," www.national.com, Apr. 1997, 12 pages.

Nguyen, L.D., et al., "Ultra-High-Speed Modulation-Doped Field-Effect Transistors: A Tutorial Review," Proceedings of the IEEE, Apr. 1992, pp. 494-518, vol. 80, No. 4, IEEE.

Niemela, V.A., et al., "Comparison of GaAs and Silicon Synchronous Rectifiers in a 3.3V Out, 50W DC-DC Converter," 27th Annual IEEE Power Electronics Specialists Conference, Jun. 1996, pp. 861-867, vol. 1, IEEE.

Ninomiya, T., et al., "Static and Dynamic Analysis of Zero-Voltage-Switched Half-Bridge Converter with PWM Control," Proceedings of 1991 IEEE Power Electronics Specialists Conference (PESC '91), 1991, pp. 230-237, IEEE, Los Alamitos, CA.

O'Meara, K., "A New Output Rectifier Configuration Optimized for High Frequency Operation," Proceedings of 1991 High Frequency Power Conversion (HFPC '91) Conference, Jun. 1991, pp. 219-225, Toronto, CA.

Peng, C., et al., "A New Efficient High Frequency Rectifier Circuit," Proceedings of 1991 High Frequency Power Conversion (HFPC '91) Conference, Jun. 1991, pp. 236-243, Toronto, CA.

Plumton, D.L., et al., "A Low On-Resistance High-Current GaAs Power VFET," IEEE Electron Device Letters, Apr. 1995, pp. 142-144, vol. 16, No. 4, IEEE.

Rajeev, M., "An Input Current Shaper with Boost and Flyback Converter Using Integrated Magnetics," Power Electronics and Drive Systems, 5th International Conference on Power Electronics and Drive Systems 2003, Nov. 17-20, 2003, pp. 327-331, vol. 1, IEEE, Los Alamitos, CA.

Severns, R., "Circuit Reinvention in Power Electronics and Identification of Prior Work," Proceedings of 1997 IEEE Applied Power Electronics Conference (APEC '97), 1997, pp. 3-9, IEEE, Los Alamitos, CA.

Severns, R., "Circuit Reinvention in Power Electronics and Identification of Prior Work," IEEE Transactions on Power Electronics, Jan. 2001, pp. 1-7, vol. 16, No. 1, IEEE, Los Alamitos, CA.

Sun, J., et al., "Unified Analysis of Half-Bridge Converters with Current-Doubler Rectifier," Proceedings of 2001 IEEE Applied Power Electronics Conference, 2001, pp. 514-520, IEEE, Los Alamitos, CA.

Sun, J., et al., "An Improved Current-Doubler Rectifier with Integrated Magnetics," 17th Annual Applied Power Electronics Conference and Exposition (APEC), 2002, pp. 831-837, vol. 2, IEEE, Dallas, TX.

Texas Instruments Incorporated, "LT1054, LT1054Y Switched-Capacitor Voltage Converters With Regulators," SLVS033C, Feb. 1990—Revised Jul. 1998, 25 pages.

Thaker, M., et al., "Adaptive/Intelligent Control and Power Management Reduce Power Dissipation and Consumption," Digital Power Forum '06, 11 pp., Sep. 2006, Darnell Group, Richardson, TX.

Vallamkonda, S., "Limitations of Switching Voltage Regulators," A Thesis in Electrical Engineering, Texas Tech University, May 2004, 89 pages.

Weitzel, C.E., "RF Power Devices for Wireless Communications," 2002 IEEE MTT-S CDROM, 2002, pp. 285-288, paper TU4B-1, IEEE, Los Alamitos, CA.

Williams, R., "Modern GaAs Processing Methods," 1990, pp. 66-67, Artech House, Inc., Norwood, MA.

Xu, M., et al., "Voltage Divider and its Application in the Two-stage Power Architecture," Center for Power Electronics Systems, Virginia Polytechnic Institute and State University, IEEE, 2006, Blacksburg, Virginia, pp. 499-505.

Xu, P., et al., "Design of 48 V Voltage Regulator Modules with a Novel Integrated Magnetics," IEEE Transactions on Power Electronics, Nov. 2002, pp. 990-998, vol. 17, No. 6, IEEE, Los Alamitos, CA.

Xu, P., et al., "A Family of Novel Interleaved DC/DC Converters for Low-Voltage High-Current Voltage Regulator Module Applications," IEEE Power Electronics Specialists Conference, Jun. 2001, pp. 1507-1511, IEEE, Los Alamitos, CA.

Xu, P., et al., "A Novel Integrated Current Doubler Rectifier," IEEE 2000 Applied Power Electronics Conference, Mar. 2000, pp. 735-740, IEEE, Los Alamitos, CA.

Yan, L., et al., "Integrated Magnetic Full Wave Converter with Flexible Output Inductor," 17th Annual Applied Power Electronics Conference and Exposition (APEC), 2002, pp. 824-830, vol. 2, IEEE, Dallas, TX.

Yan, L., et al., "Integrated Magnetic Full Wave Converter with Flexible Output Inductor," IEEE Transactions on Power Electronics, Mar. 2003, pp. 670-678, vol. 18, No. 2, IEEE, Los Alamitos, CA.

Zhou, X., et al., "A High Power Density, High Efficiency and Fast Transient Voltage Regulator Module with a Novel Current Sensing and Current Sharing Technique," IEEE Applied Power Electronics Conference, Mar. 1999, pp. 289-294, IEEE, Los Alamitos, CA.

Zhou, X., et al., "Investigation of Candidate VRM Topologies for Future Microprocessors," IEEE Applied Power Electronics Conference, Mar. 1998, pp. 145-150, IEEE, Los Alamitos, CA.

Freescale Semiconductor, "Design of a Digital AC/DC SMPS using the 56F8323 Device, Designer Reference Manual, 56800E 16-bit Digital Signal Controllers", DRM074, Rev. 0, Aug. 2005 (108 pages).

Freescale Semiconductor, "56F8323 Evaluation Module User Manual, 56F8300 16-bit Digital Signal Controllers", MC56F8323EVMUM, Rev. 2, Jul. 2005 (72 pages).

Freescale Semiconductor, "56F8323/56F8123 Data Sheet Preliminary Technical Data, 56F8300 16-bit Digital Signal Controllers," MC56F8323 Rev. 17, Apr. 2007 (140 pages).

Power Integrations, Inc., "TOP200-4/14 TOPSwitch® Family Three-terminal Off-line PWM Switch," Internet Citation http://www.datasheet4u.com/.download.php?id=311769, Jul. 1996, XP002524650, pp. 1-16.

* cited by examiner

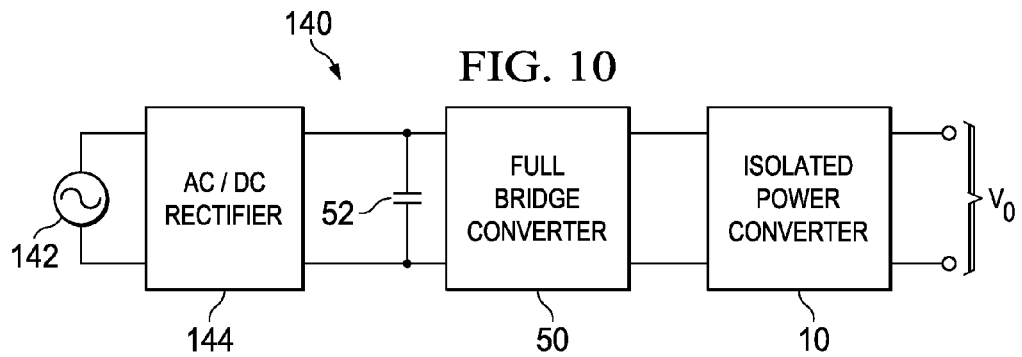
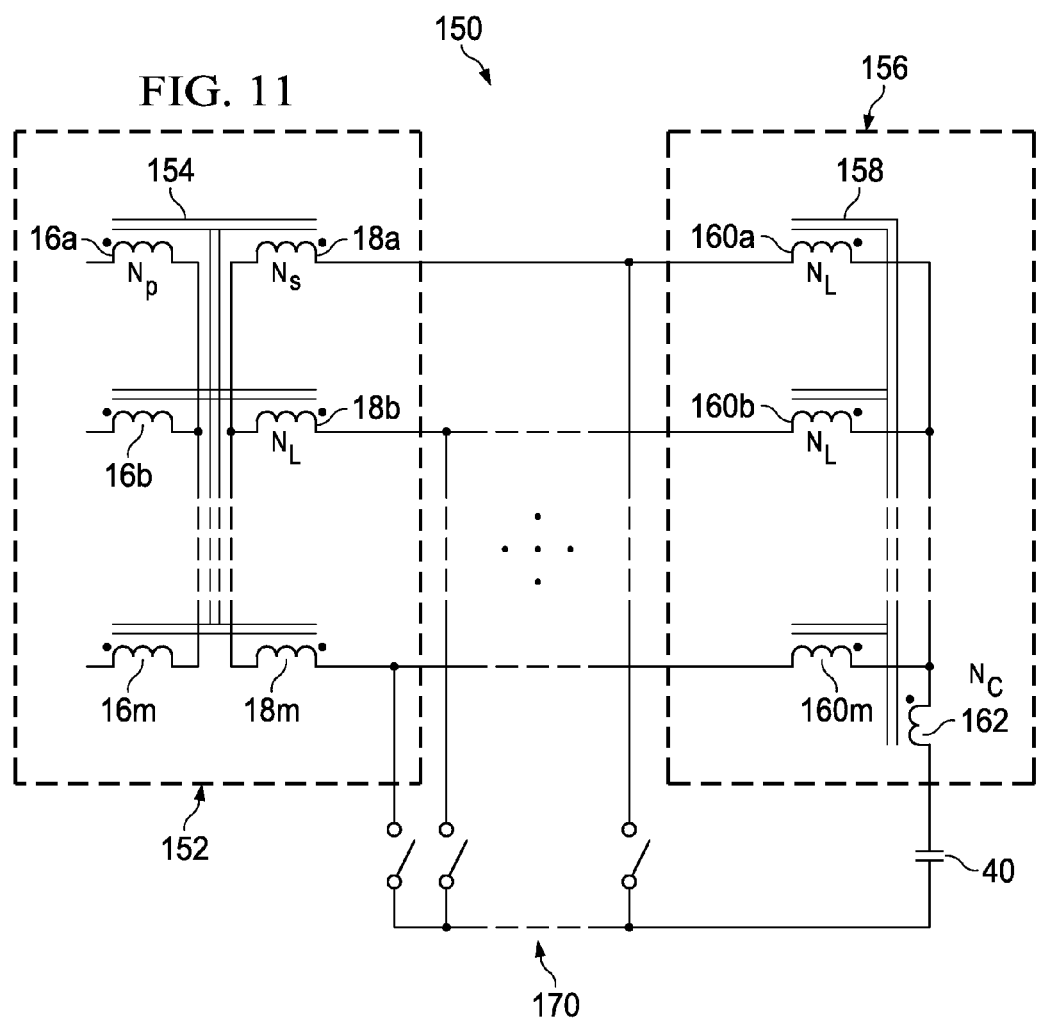

ISOLATED POWER CONVERTER

This application is a continuation of patent application Ser. No. 11/686,140, entitled "Isolated Power Converter," filed on Mar. 14, 2007 (now U.S. Pat. No. 7,468,649), which application is incorporated herein by reference.

TECHNICAL FIELD

The present invention is directed, in general, to power electronics and, in particular, to isolated power converters and methods of operating and manufacturing the same.

BACKGROUND

Most people are aware that electrical devices generally require electrical power to operate. Electrical power requirements often vary greatly, however, between different types of electrical devices. For example, even though both a lamp and a computer plug into the same wall outlet, these two devices may operate at different electrical voltages. To make this possible, many electrical devices employ power converters that control, condition, or convert power between the source and the load. For example, a power converter in a computer may receive power from a wall outlet at one voltage level and convert that power to another voltage level suitable to power the computer. In this way, power converters enable a great variety of electrical devices to receive power from a single standardized power source (e.g., a wall outlet, a car engine, etc.). One type of power converter, known as an isolated power converter, employs a transformer (amongst other components) to perform this power conversion.

Accordingly, what is needed in the art is an isolated power converter topology that overcomes the deficiencies of the prior art.

SUMMARY OF THE INVENTION

Certain aspects commensurate in scope with the disclosed embodiments are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

There is provided an isolated power converter. More particularly, in one embodiment, there is provided a power converter including a first magnetic core having a primary winding and a secondary winding around the first magnetic core. The power converter also includes a second magnetic core having a first leg, a second leg coupled to the first leg, and a third leg coupled to the first and second legs, wherein a part of the third leg is equidistant from the first leg and the second leg. The second magnetic core has a first winding encircling the first leg, a first end of the first winding coupled to the secondary winding, a second winding encircling the second leg, a first end of the second winding coupled to the secondary winding, and a third winding encircling the third leg, a first end of the third winding coupled to a second end of the first winding and to a second end of the second winding.

BRIEF DESCRIPTION OF THE DRAWINGS

FIG. 10 is a block diagram of an exemplary power conversion system employing the isolated power converter of FIG. 1 in accordance with one embodiment;

FIG. 11 is a schematic diagram of a generalized exemplary m-phase power converter based on a full bridge topology on the primary side in accordance with one embodiment;

Like reference symbols in the various drawings indicate like elements.

DETAILED DESCRIPTION OF ILLUSTRATIVE EMBODIMENTS

Figure 1:
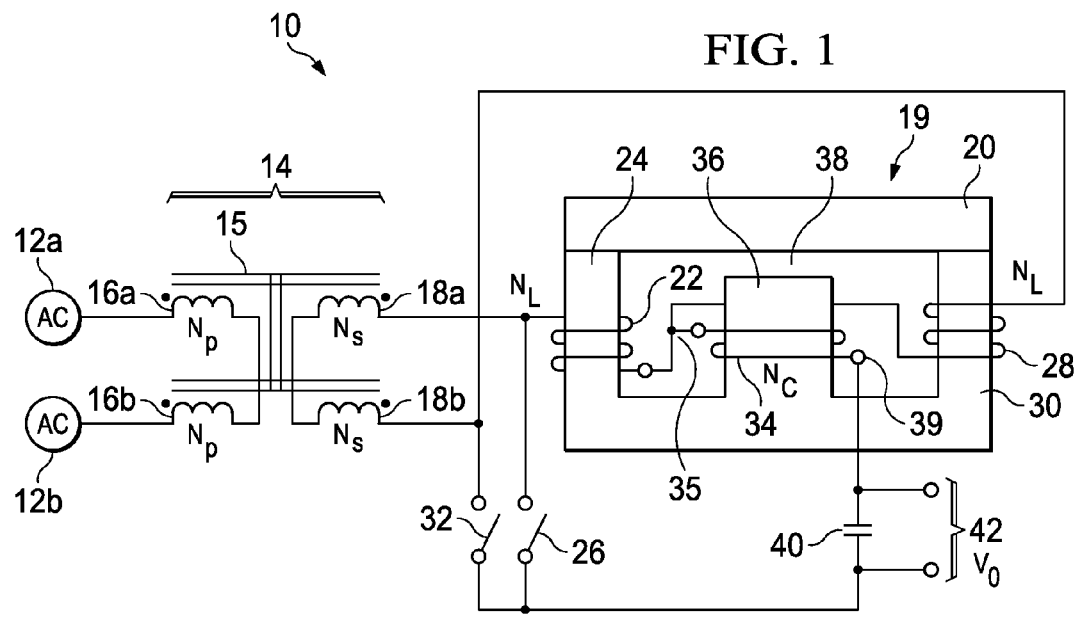
FIG. 1 is a diagram of an exemplary isolated power converter employing an inductor assembly in accordance with one embodiment.

With reference to FIG. 1, a diagram of an exemplary isolated power converter 10 employing an inductor assembly in accordance with one embodiment is illustrated. In one embodiment, isolated power converter 10 is an alternating current ("AC") to direct current ("DC") converter. In alternate embodiments, however, the power converter may perform other suitable forms of power conversion.

As illustrated, power converter 10 may include one or more AC sources 12a and 12b. The AC sources (also collectively designated 12) provide an electrical current whose magnitude and direction vary cyclically. For example, in one embodiment, AC sources 12 provide an AC signal with a sine wave waveform. In other embodiments, AC sources 12 may provide an AC signal with a square waveform, a sawtooth waveform, or a triangle waveform. It will be appreciated, however, that these embodiments are not intended to be exclusive. As such, in alternate embodiments, AC signals with other suitable AC waveforms, such as the quasi-square wave described below, may be employed.

AC sources 12 may generate the AC signals themselves, or they may receive and/or condition AC signals from another source. For example, as will be described further below, AC sources 12 may draw their power from a regulated source, such as a wall outlet, from another power converter, such as a full bridge converter (see discussion of FIG. 4 below), or from another suitable AC source 12. Further, in one embodiment, AC sources 12a and 12b are configured to provide AC signals that are shifted in phase from each other. For example, the AC power provided by AC source 12a may be 180 degrees out-of-phase with the AC power provided by AC source 12b. As will be described further below, in one embodiment, employing multiple AC signals that are shifted in phase from each other enables power converter 10 to provide an output current with reduced switching ripple.

AC sources 12 may be coupled to a transformer 14 that includes a magnetic core 15, primary windings (collectively designated 16), and secondary windings (collectively designated 18). As those of ordinary skill in the art will appreciate, transformer 14 transfers energy from primary windings 16 to secondary windings 18 via a magnetic coupling between the two windings along magnetic core 15. In various embodiments, magnetic core 15 may comprise steel, iron, ferrite, or other suitable core materials. As shown in FIG. 1, in at least one embodiment, transformer 14 includes two sets of primary windings 16a and 16b and two sets of secondary windings 18a and 18b coupled to or corresponding to AC sources 12a and 12b. Primary windings 16 may comprise copper wire, aluminum wire, gold wire, etc.

Primary windings 16 may be wrapped around or encircle the magnetic core 15 for a suitable number of turns, $N_p$, and secondary windings 18 may be wrapped around or encircle magnetic core 15 for a suitable number of turns, $N_s$. For the purposes of this document, a winding or wire is encircling or wrapped around a structure, such as a magnetic core, if that winding or wire traverses at least partially around the surface of the structure. For example, a winding is considered to be wrapped around a magnetic core if a current through the winding induces a flux in the magnetic core.

The voltage generated in secondary windings 18 will be a function of the voltage at primary windings 16 multiplied by the ratio $N_s/N_p$. For example, if $N_s=1$ and $N_p=10$, then 400 volts ("V") on primary windings 16 will generate roughly 40V on secondary windings 18. Of course, as the total power cannot change, the current in secondary windings 18 will be roughly ten times the current in primary windings (i.e., $N_p/N_s$). It will be appreciated, however, that winding resistance, leakage effects, induced eddy currents, and a variety of other types of losses will affect the power transfer across transformer 14 thereby reducing the actual voltage and/or current in secondary windings 18 from the ideal (i.e., 40V).

Secondary windings 18 may be coupled to an inductor assembly 19, which includes a magnetic core 20. As with magnetic core 15 of transformer 14, magnetic core 20 may be comprised of any suitable core material, including but not limited to steel, ferrite, or iron. Magnetic core 20 illustrated in FIG. 1 is an E-I core, named as such due to its shape (i.e., an "I" shaped core geometry fastened on top of an "E" shaped core geometry). An E-E core (two E-shaped cores facing each other) geometry may also be employed as the magnetic core 20. In addition, in alternate embodiments, such as the exemplary one described below with regard to FIG. 11, other suitable core geometries may be employed.

In the illustrated configuration, secondary winding 18a is coupled to a first end of a first winding 22 that is wrapped around a first leg 24 of magnetic core 20. First winding 22 is wrapped around first leg 24 to form $N_L$ turns. First winding 22 in combination with first leg 24 forms an inductor. As such, first winding 22 will alternatively be referred to as an inductor or inductor winding 22. Secondary winding 18a is also coupled to a first switch 26. In one embodiment, first switch 26 functions as a rectification component such as a synchronous rectifier for the power converter 10. As such, first switch 26 may be employed to convert/rectify the AC signal generated on the secondary side of transformer 14 to a DC signal. In this embodiment, the first switch 26 may be a metal-oxide semiconductor field-effect transistor ("MOSFET") switch. In alternate embodiments, however, switch 26 may be replaced or supplemented by a diode or other suitable rectification circuitry.

Secondary winding 18b is coupled to a first end of a second winding 28 that is wrapped around a second leg 30 of magnetic core 20. Second winding 28 is wrapped around second leg 30 to form $N_L$ turns. Second winding 28 in combination with second leg 30 forms an inductor. As such, second winding 28 will alternatively be referred to as an inductor or inductor winding 28. Secondary winding 18b is also coupled to a second switch 32. As will be described further below, second switch 32 may also be employed to convert/rectify the AC signal generated on the secondary side of transformer 14 to a DC signal. In alternate embodiments, switch 32 may be replaced or supplemented by a diode or other suitable rectification circuitry.

The second ends of both first winding 22 and second winding 28 are coupled together and coupled to a first end of a center winding 34, as indicated by reference numeral 35. Center winding 34 is wrapped around a center leg 36 of magnetic core 20 to form $N_C$ turns. Center leg 36, in the E-I core geometry, is placed in the window between first leg 24 and second leg 30. Typically, it is preferred to place center leg 36 such that a part of center leg 36 is equidistant from first leg 24 and second leg 30 to achieve a relatively symmetric core geometry. However, depending on the application, center leg 36 can be placed anywhere in the window between first leg 24 and second leg 30. Center winding 34 in combination with center leg 36 forms an inductor. As such, center winding 34 will alternatively be referred to as inductor or center inductor winding 34. As more clearly shown in FIG. 2 below, center winding 34 is arrayed in series with the junction of first winding 22 and second winding 28.

As shown in FIG. 1, center leg 36 may include an air gap 38. As will be appreciated, air gap 38 stores majority of the inductor energy necessary for the operation of power converter 10. In particular, as air typically has lower permeance than the core material and cannot saturate, air gap 38 is able to limit the magnetic flux such that flux density in the magnetic core 20 is below the saturation limit of the material. The air gap 38 height should be chosen to achieve the required inductance while preventing core saturation. Increasing the air gap 38 height to prevent core saturation results in reduced inductance and increased fringing flux. This flux can impinge on winding surfaces causing eddy currents, hence increased losses in the windings. The design of the air gap 38, thus involves multiple trade-offs in achieving a functioning inductor. Air gaps can be used in transformer cores, such as the core 15, as well to reduce the magnetizing inductance and increase the magnetizing current. Nonetheless, it will be appreciated that in alternate embodiments, air gap 38 may be omitted or replaced by another suitable energy storage component. This could be another material with a lower permeance and higher saturation limit than the material used for the remainder of the core. Further, in still other embodiments, air gaps and/or equivalent core materials may be inserted into first leg 24 and second leg 30 in place of or in addition to air gap 38.

Second end 39 of center winding 34, as shown in FIG. 1, may be coupled to a filter capacitor 40. Filter capacitor 40 may act in combination with inductor assembly 19 to form a filter capable of "smoothing" out a noisy DC signal created by first switch 26 and second switch 32 to create a smoother, less rippled DC output $V_O$ 42. However, filter capacitor 40 may be omitted in some configurations.

Figure 2:
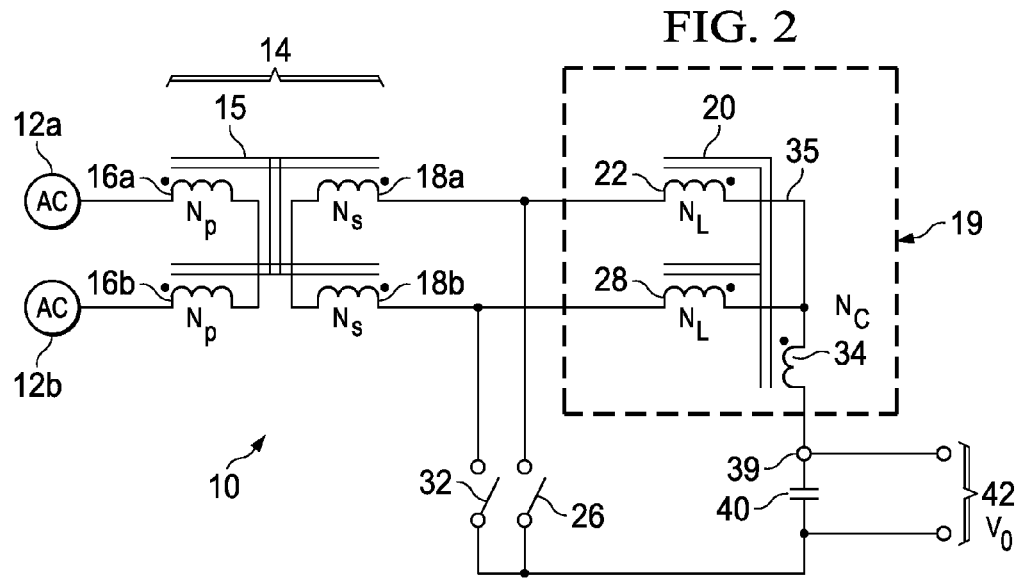
FIG. 2 is a schematic diagram of the exemplary isolated power converter of FIG. 1 in accordance with one embodiment.

FIG. 2 illustrates a schematic diagram of exemplary isolated power converter 10 of FIG. 1. In the schematic diagram, inductor assembly 19 includes first, second and center windings 22, 28, 34 illustrated using the schematic symbol for winding and magnetic core 20 is illustrated using the schematic symbol for a magnetic core. The schematic view in FIG. 2 more clearly shows the series relationship between center winding 34 with the junction of first winding 22 and second winding 28.

Figure 3:
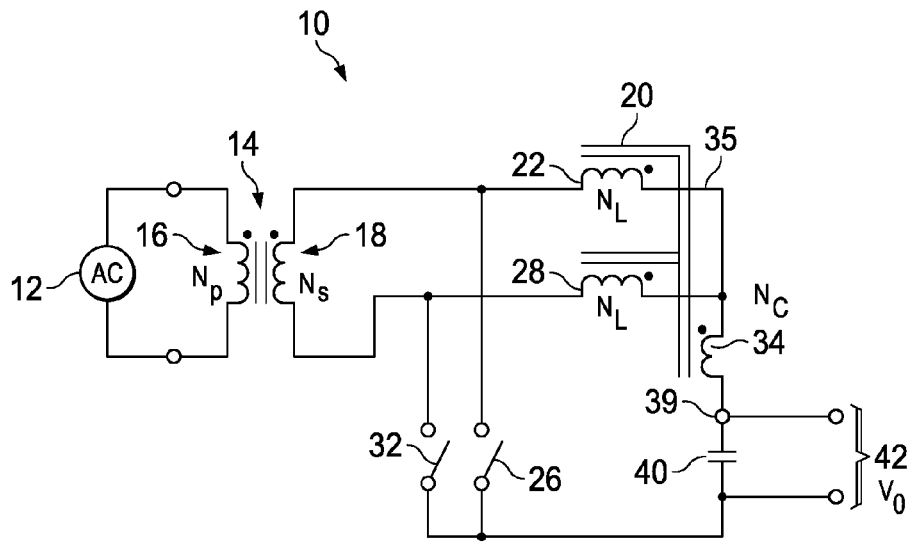
FIG. 3 is a schematic diagram of an alternate embodiment of an exemplary isolated power converter in accordance with one embodiment.

FIG. 3 illustrates a schematic diagram of an alternate embodiment of exemplary isolated power converter 10 of FIG. 1. In particular, FIG. 3 shows a single AC source 12 that provides an AC signal that is a combination of the individual AC signals produced by AC sources 12a and 12b of FIGS. 1 and 2. Further, transformer 14 is depicted in FIG. 3 as including a single primary winding 16 and a single secondary winding 18 to transform the unified AC signal from AC source 12.

Figure 4:
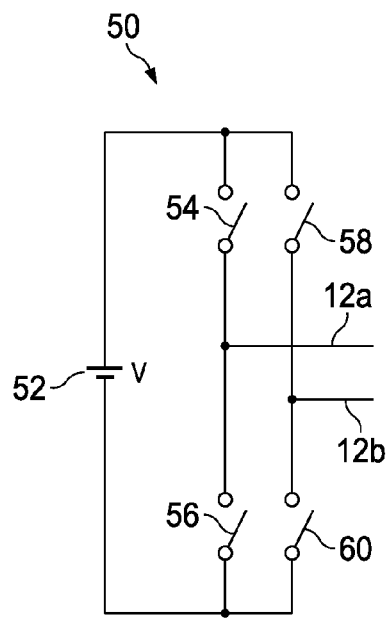
FIG. 4 is a schematic diagram of a full bridge converter in accordance with one embodiment.

As described above, AC sources 12 may provide an AC signal to the primary side of transformer 14. In one embodiment, AC source 12 may receive this AC signal from another converter, such as full bridge converter 50 that is illustrated in FIG. 4 in accordance with one embodiment. Although the discussion below will focus on embodiments converting a quasi-square wave AC signal generated by full bridge converter 50, it will be appreciated that full bridge converter 50 is only one exemplary system for generating an appropriate AC signal. As such, in alternate embodiments, AC signal may be received from other suitable sources, including, but not limited to half-bridge converters, push-pull converters, multi-level converters, public utilities, AC generators, other transformers, and the like.

Figure 6:
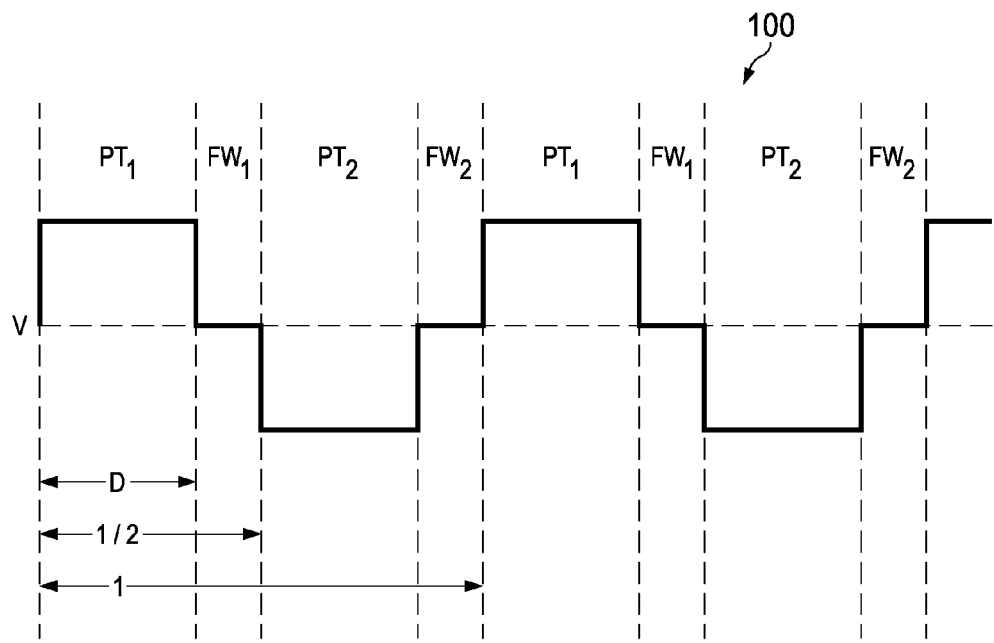
FIG. 6 illustrates an exemplary quasi-square wave in accordance with one embodiment.

Full bridge converter 50 includes a DC source 52. In one embodiment, DC source 52 may comprise an AC rectifier configured to generate a DC signal from an incoming AC signal. DC source 52 may be coupled to four switching devices 54, 56, 58, and 60. In one embodiment, switching devices 54, 56, 58, and 60 comprise MOSFET switches. In operation, switching devices 54, 56, 58, and 60 may be gated to produce an AC signal that is a symmetrical quasi-square wave (i.e., a square wave with dead time). An exemplary quasi-square wave is depicted in FIG. 6 and described further below.

Figure 5:
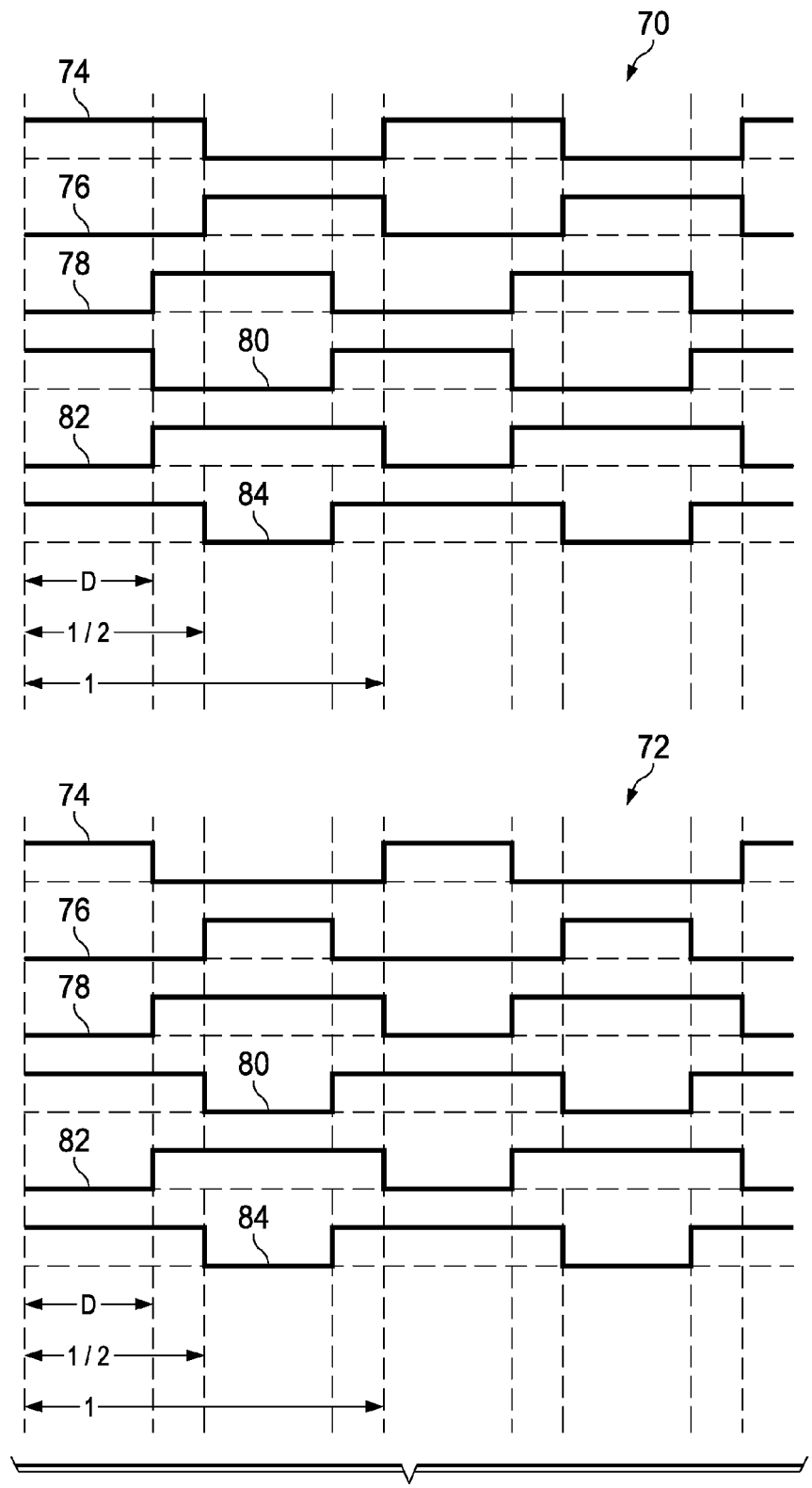
FIG. 5 illustrates two exemplary timing diagrams for the switching devices of full bridge converter of FIG. 4 that enable the generation of a quasi-square wave AC input suitable for the power converter of FIG. 1 in accordance with one embodiment.

FIG. 5 illustrates two exemplary timing diagrams 70 and 72 for switching devices 54, 56, 58, and 60 of full bridge converter 50 of FIG. 4 that enable the generation of a quasi-square wave AC input for power converter 10 of FIG. 1. More specifically, FIG. 5 shows a gating pattern 74 for switching device 54, a gating pattern 76 for switching device 56, a gating pattern 78 for switching device 58, and a gating pattern 80 for switching device 60. In addition, timing diagrams 70 and 72 also include gating patterns 82 and 84 that may be employed to control switching devices (first switch 26 and second switch 32 of FIG. 1) to convert the quasi-square wave signal of FIG. 6 into a DC signal.

Both timing schemes depicted in diagrams 70 and 72 result in same voltage ratio (input voltage/output voltage) for power converter 10. This ratio is given by the Equation 1 below:

$$\frac{V_o}{V_{in}} = D \frac{N_s}{N_p},$$

where $V_O$ is the output voltage, $V_{in}$ is the input voltage, and D is the duty cycle. In the timing diagram 70, the duty cycle for gating patterns applied to switching devices 54, 56, 58, and 60 is 50%. The duty cycle D that determines the input-output voltage ratio is related to the phase shift between the gating signals shown in timing diagram 70 applied to each leg of full bridge converter 50. On the other hand, in timing diagram 72, switching devices 54 and 58 are gated with duty cycle D while switching devices 56 and 60 are gated with duty cycle 1-D. Further, as shown, first switch 26 and second switch 32 (i.e., the secondary side synchronous rectifiers) are gated with duty cycle 1-D in both timing diagram 70 and timing diagram 72.

The voltage across primary winding 16, synthesized according to either of the timing diagrams shown in FIG. 5, is quasi-square wave 100 shown in FIG. 6. From FIG. 6, it can be seen that quasi-square wave 100 and thus power converter 10 goes through four distinct stages over a single switching period. These four stages are referred to as the Power Transfer ("PT") 1 stage, the Free-Wheeling ("FW") 1 stage, the PT2 stage and the FW2 stage. During PT1 and PT2 stages, power is transferred to output 42 from the input across transformer 14, because the AC signal at secondary windings 18 has an absolute value greater than zero. On the other hand, during FW1 and FW2 stages, the energy stored in inductor assembly 19 is transferred to output 42, because the AC signal at secondary windings 18 is at zero volts.

Figure 7:
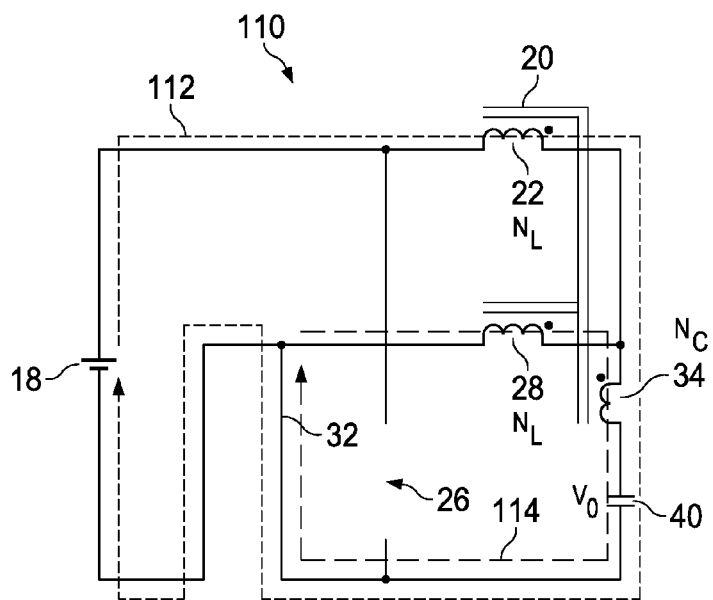
FIG. 7 is a schematic representation of an equivalent circuit for the secondary side of the power converter of FIG. 1 during the PT1 stage in accordance with one embodiment.
Figure 8:
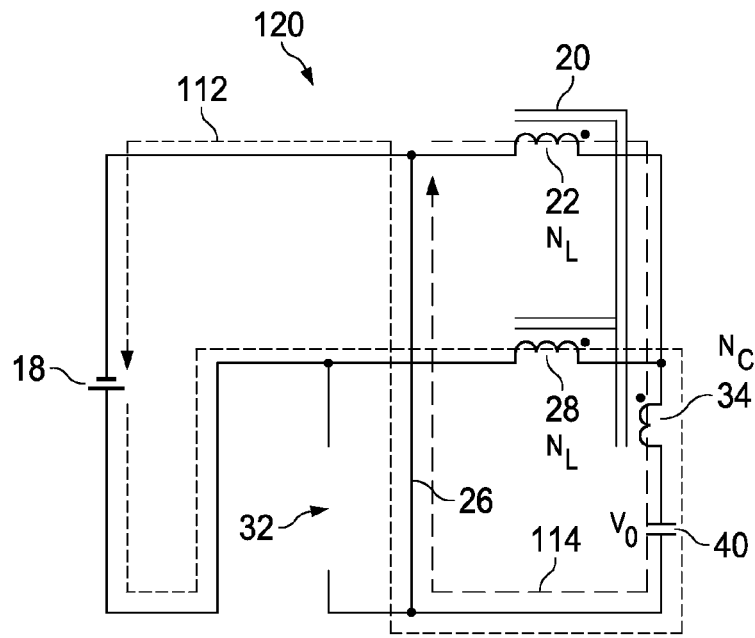
FIG. 8 is a schematic representation of an equivalent circuit for the secondary side of the power converter of FIG. 1 during the PT2 stage in accordance with one embodiment.
Figure 9:
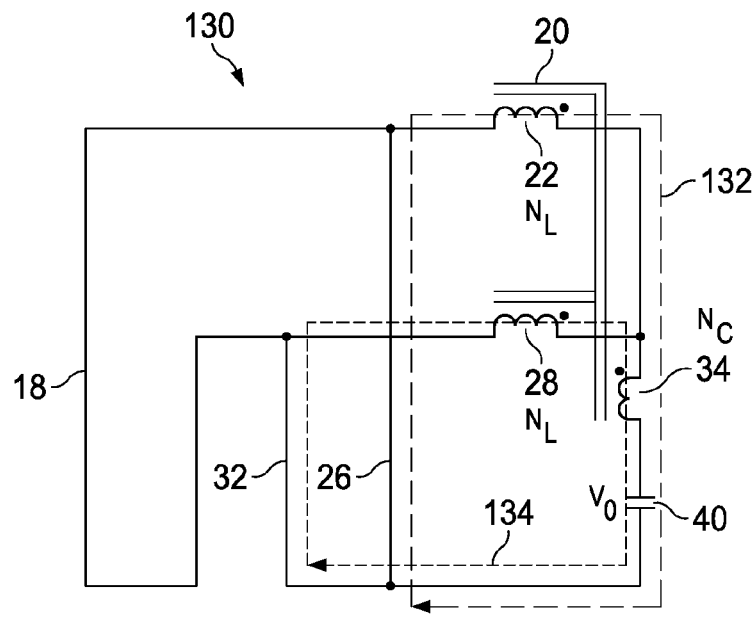
FIG. 9 is a schematic representation of an equivalent circuit for the secondary side of the power converter of FIG. 1 during the FW1 and FW2 stages in accordance with one embodiment.

FIGS. 7-9 illustrate equivalent circuits and current directions for the secondary side of power converter 10 of FIG. 1 during each stage of operation over the switching periods that are presented in FIG. 6. For example, FIG. 7 shows a schematic representation of an equivalent circuit 110 for the secondary side of power converter 10 of FIG. 1 during the PT1 stage in accordance with one embodiment. In equivalent circuit 110, secondary windings 18 are illustrated as a DC power source, because a DC source is equivalent of the AC signal generated on secondary windings 18 during the PT1 stage (see FIG. 6). The first switch 26 is in an open state during the PT1 stage, and is, thus, illustrated in FIG. 7 by a gap in the circuit (i.e., the equivalent of an open switch). The second switch 32 is closed during PT1 stage, so second switch 32 is replaced in equivalent circuit 110 by a wire (i.e., the equivalent of a closed switch). During the stage PT1, current 112 flows from secondary winding 18 through filter capacitor 40 and through second switch 32. Likewise, current 114 also flows through filter capacitor 40. Inductor formed with first winding 22 is charged with current 112, while inductor formed with second winding 24 freewheels current 114 through the output and second switch 32. The sum of the currents 112 and 114 charges inductor formed with center winding 34.

The equivalent circuit 120 of FIG. 8 shows a schematic representation of the secondary side of power converter 10 of FIG. 1 during the PT2 stage in accordance with one embodiment. As shown, similar to the PT1 stage, during the PT2 stage, current 112 flows from secondary side through filter capacitor 40. Because during PT2 stage, quasi-square wave 100 (see FIG. 6) is negative, and, thus, current 112 flows in opposite direction in equivalent circuit 120 than it did in equivalent circuit 110 of FIG. 7. However, because gating patterns 82 and 84 for first switch 26 and second switch 32 are synchronized with the positive and negative swings of quasi square wave 100, current 112 and current 114 both still flow through filter capacitor 40 in the same direction during PT2 stage as they did during PT1 stage (see FIG. 7). In this way, first switch 26 and second switch 32 enable the conversion of the AC input signal to a DC output signal. Further, during the PT2 stage, inductor formed with second winding 24 is charged with current 114, while inductor formed with first winding 22 freewheels current 112 through the output and first switch 26. The sum of the currents 112 and 114 charges inductor formed by the center winding 34.

When power converter 10 is in the FW1 and FW2 stages, the energy stored in inductor assembly 19 is transferred to the filter capacitor 40 through the freewheeling current. This transference is illustrated in FIG. 9, which shows an equivalent circuit 130 of power converter 10 of FIG. 1 during the FW1 and FW2 stages in accordance with one embodiment. In equivalent circuit 130, secondary windings 18 are replaced by a wire, as quasi-square wave 100 (see FIG. 6) is at zero volts during the FW1 and FW2 stages. The energy stored in inductor assembly 19 is transferred to the load (from the PT1 and PT2 stages) through freewheeling currents 132 and 134, which flow in the same direction towards the filter capacitor 40 as currents 112 and 114 in FIGS. 7 and 8. It should be noted that there will be progressively less ripple in the DC output as the combined inductance of inductor assembly 19 increases and/or the capacitance of filter capacitor 40 increases. However, large inductors and large capacitor are expensive both in cost and size. As will be described in greater detail below, one of the advantages of power converter 10 is that center winding 34 provides an increase in the total available inductance enabling relatively smaller inductance associated with first winding 22 and second winding 28 and/or a smaller filter capacitor 40 to be employed.

The design of power converter 10 may provide several advantages over and above conventional topologies including reduced switching ripple in the flux density in first leg 24 and second leg 30, which results in reduced core losses, and increased inductance due to center winding 34 resulting in reduced switching ripple in the output current. This reduced switching ripple can enable filter capacitor 40 to have a lower capacitance value, which equates to a smaller sized capacitor than conventional isolated power converters. Power converter 10 may also provide a wider stability region for peak current mode control before sub-harmonic oscillations occur in the inductor currents.

The flux density switching ripple in first leg 24 and second leg 30 and center leg 36 for power converter 10 is given by the following Equation 2 below:

$$\Delta B_L = \frac{N_L + \frac{N_C}{1-D}}{N_L + 2N_C} \frac{V_o}{N_L} \frac{1-D}{f_s} \frac{1}{A_L},$$

$$\Delta B_C = \frac{V_o}{N_L + 2N_C} \frac{1-2D}{f_s} \frac{1}{A_C}$$

where $\Delta B_L$ is the flux density of first leg 24 and second leg 30, $\Delta B_C$ is the flux density of center leg 36, $f_s$ is the switching frequency, $A_L$ is the cross sectional area of first leg 24 and second leg 30, and $A_C$ is the cross-sectional area of center leg 36. It can be seen from Equation 2, that center winding 34 reduces the flux density ripple in both first leg 24 and second leg 30 and center leg 36 resulting in reduced core loss and higher efficiency power conversion.

The effective filter inductance seen by a load of power converter 10 is given by the Equation 3 below:

$$L_{f,eq} = \frac{(N_L + 2N_C)^2}{R_L + 2R_C}.$$

As such, if $N_L=3$, for example, the effective filter inductance in power converter 10 can be increased by a factor of 2.8 by using a single turn center winding 34 (i.e., $N_C$) over a conventional power converter lacking center winding 34. Moreover, because this increase in inductance comes while using a standard E-I core, magnetic core 20 may occupy no more additional space in power converter 10 than the standard E-I core with reduced inductance would have in conventional systems.

FIG. 10 illustrates a block diagram of an exemplary power conversion system 140 employing the isolated power converter 10 of FIG. 1 in accordance with one embodiment. Power conversion system 140 includes an AC source 142, which in one embodiment comprises a connection to a 120 volt AC power signal provided by a public utility or a private generator. Power conversion system 140 may be coupled to AC/DC rectifier 144 which is configured to rectify the AC power signal provided by AC source 142 into a generally DC signal. AC/DC rectifier 144 may be coupled to full bridge converter 50, which is coupled to isolated power converter 10, as described above with regard to FIGS. 1-9. It will be appreciated that power conversion system 140 illustrates merely one embodiment of a power conversion system that employs power converter 10. As such, in alternate embodiments, other suitable power conversion systems may employ power converter 10.

The two phase system employed in power converter 10 can be extended to any suitable number of phases to accommodate higher power levels, tighter ripple, and/or reduced size requirements. A generalized exemplary m-phase power converter 150 based on a full bridge topology on the primary side is shown in FIG. 11 in accordance with one embodiment. As illustrated, power converter 150 features an m-phase isolation transformer 152. Transformer 152 may include a magnetic core 154 and primary windings 16 and secondary windings 18 for each of the m phases of the input AC signals employed. It will be understood that m may be any integer value greater than 2. For example, in various embodiments, m could have a value of 2, 3, 4, 5, 6, 7, 8, 9, and so forth. A representation of one configuration of a multi-phase transformer 152 suitable for use with power converter 150 of FIG. 11 is illustrated in FIG. 12 in accordance with one embodiment.

Transformer 152 is coupled to an inductor assembly 156. In one configuration, inductor assembly 156 may include a magnetic core 158, windings 160a-160m, and center winding 162. Like magnetic core 20 described above, magnetic core 158 may be comprised of any suitable core material, such as ferrite, steel, or iron. As shown in the FIG. 12, in one embodiment, magnetic core 158 may have a plurality of legs 164 upon which windings 160a-160m are wrapped with one winding per phase of the input AC signal. Magnetic core 158 may also include a center leg 166 around which center winding 162 is wrapped. It will be appreciated that the center leg 166 around which the center winding 162 is wrapped includes electrically equivalents of the structure. For example, the center leg 166 around which the center winding 162 is wrapped could be a plurality of center legs 166 having a plurality of center windings 162 arrayed in series or parallel with each other.

Figure 12:
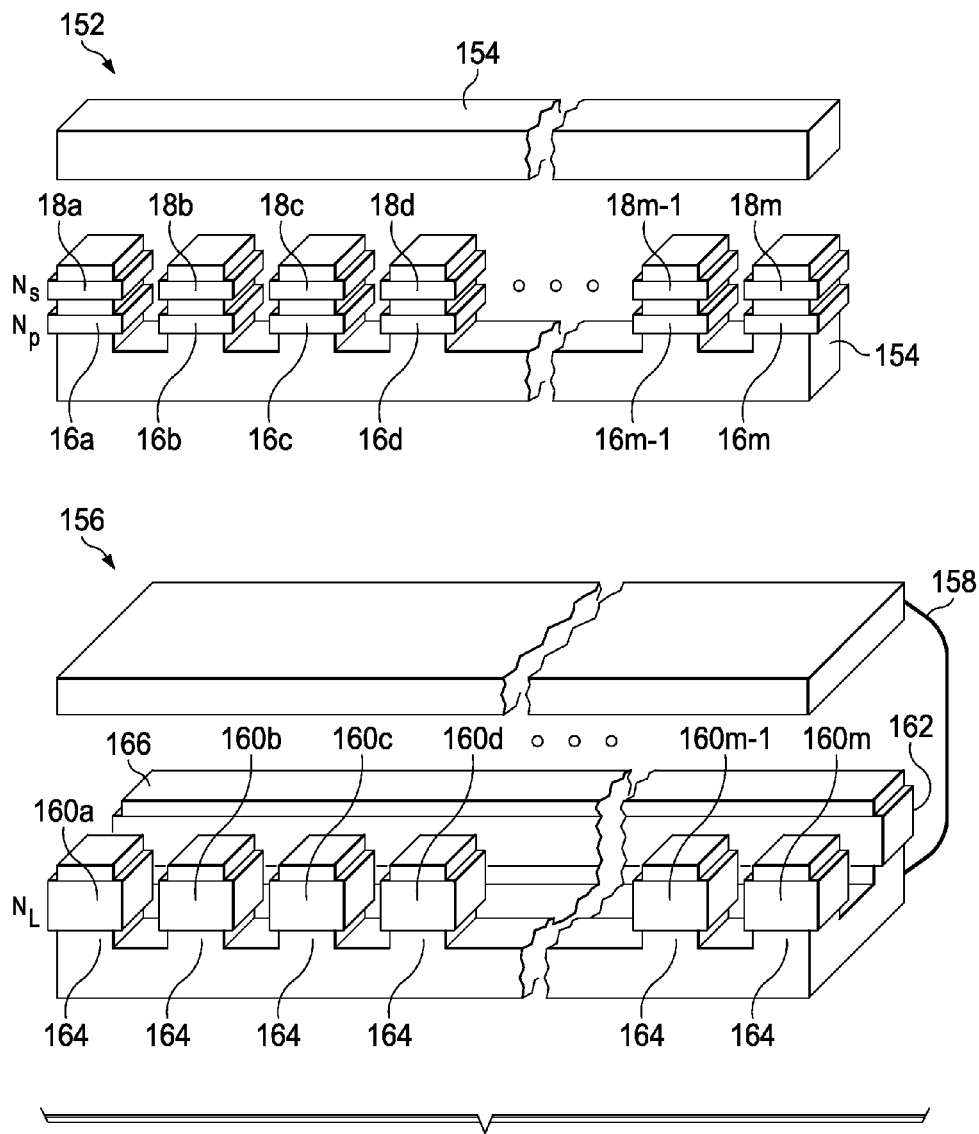
FIG. 12 shows a representation of an exemplary multiphase transformer and multiphase inductor assembly suitable for use with the power converter of FIG. 11 in accordance with one embodiment.

FIG. 12 illustrates one embodiment of a suitable design for center leg 166. However, it will be appreciated that in alternate embodiments, other suitable configurations for magnetic core 158 may be employed as long as a part of center leg 166 is equidistant or generally equidistant from each of the plurality of legs 164 that have windings 160 or the center leg 166 is located such that the flux paths from the legs 164 to the center leg 166 are almost symmetrical.

Power converter 150 may also include filter capacitor 40 (see FIG. 11), which functions substantially similar to the way that it functioned in power converter 10 of FIG. 1. Finally, power converter may include a plurality of synchronous rectification switches 170 configured to rectify the AC input signal (e.g., quasi-square wave 100) to create a DC signal.

Figure 13:
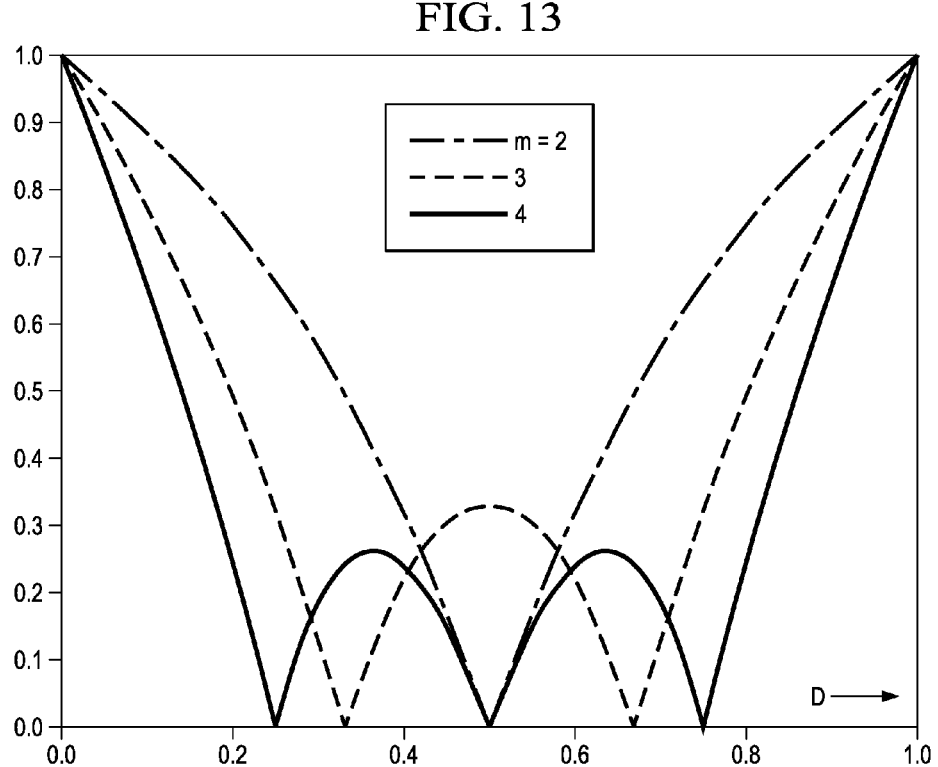
FIG. 13 is a chart showing the peak to peak switching ripple in the output current for values of m=2, m=3, and m=4 in the power converter of FIG. 11 in accordance with one embodiment.

If the phase angles of the AC input signals in power converter 150 are shifted in phase from each other by 360 degrees divided by m or shifted from each other in time by $T_s$ divided by m, the peak to peak switching ripple in the output current of power converter 150 will vary inversely with the value of m. For example, if m=2 (two-phase interleaving), the AC input signals (and thus currents 112 and 114 of FIGS. 7 and 8) are shifted in phase by half the switching period while for three-phase interleaving (m=3), the phase shift is a third of the switching period. FIG. 13 is a chart showing the peak to peak switching ripple in the output current for values of m=2, m=3, and m=4 in power converter 150 of FIG. 11 in accordance with one embodiment. As illustrated, as m increases (i.e., as the number of interleaved AC signals increases), the ripple in the output current decreases.

In various other embodiments, there are also provided methods for manufacturing power converter 10 and/or power converter 150. For example, in one embodiment, there is provided a method of manufacturing a power converter including providing a magnetic core 20 with at least three legs (first leg 24, second leg 30, and center leg 36), wherein a part of center leg 36 is equidistant to remaining first leg 24 and second leg 30. The method also includes wrapping a first winding 22, second winding 28, and center winding 34 around each of first leg 24, second leg 30, and center leg 36, coupling center winding 34 around equidistant center leg 36 in series to the junction of each of first winding 22 and second winding 28 around each of remaining first leg 24 and second leg 30, and coupling first winding 22 and second winding 28 around each of remaining first leg 24 and second leg 30 to the secondary side of transformer 14. This method may also include coupling a capacitor 40 to center winding 34 around equidistant center leg 36, coupling a rectification component (first switch 26 and second switch 32) to the winding the second side of the transformer, and/or coupling a primary side of the transformer to an AC source 12.

It will be seen by those skilled in the art that many embodiments taking a variety of specific forms and reflecting changes, substitutions, and alternations can be made without departing from the spirit and scope of the invention. Therefore, the described embodiments illustrate but do not restrict the scope of the claims.

What is claimed is:

1. A power converter, comprising:
   a transformer including a transformer core with a plurality of legs; and
   an inductor, coupled to the transformer, including:
      an inductor core including first and second outer legs and a center leg,
      first and second inductor windings wrapped around the first and second outer legs, respectively, and
      a center inductor winding wrapped around the center leg and with a first end connected to the first and second inductor windings, the center leg having a part thereof equidistant from the first and second outer legs.

2. The power converter of claim 1 wherein a first end of the first and second inductor windings is coupled to a secondary winding wrapped around one of the plurality of legs of the transformer core, and the first end of the center inductor winding is connected to a second end of the first and second inductor windings.

3. The power converter of claim 1 further comprising a capacitor coupled to a second end of the center inductor winding.

4. The power converter of claim 2 further comprising a rectification component coupled to the first end of the first and second inductor windings.

5. The power converter of claim 4 wherein the rectification component is selected from the group consisting of:
   a synchronous rectifier, and
   a diode.

6. The power converter of claim 1 wherein the transformer includes a primary winding and a secondary winding wrapped around one of the plurality of legs of the transformer core.

7. The power converter of claim 1 wherein the center leg of the inductor has an air gap.

8. The power converter of claim 1 further comprising at least one switching device coupled to the transformer.

9. The power converter of claim 1 further comprising a plurality of switching devices forming a full bridge topology coupled to the transformer.

10. The power converter of claim 9 wherein the plurality of switching devices are configured to be controlled to produce a symmetrical quasi-square wave AC signal.

11. A method of manufacturing a power converter, comprising:
   forming a transformer including a transformer core with a plurality of legs; and
   forming an inductor, coupled to the transformer, including:
      providing an inductor core including first and second outer legs and a center leg,
      wrapping first and second inductor windings around the first and second outer legs, respectively, and
      wrapping a center inductor winding around the center leg and with a first end connected to the first and second inductor windings, the center leg having a part thereof equidistant from the first and second outer legs.

12. The method of claim 11 wherein forming the inductor includes coupling a first end of the first and second inductor windings to a secondary winding wrapped around one of the plurality of legs of the transformer core, and connecting the first end of the center inductor winding to a second end of the first and second inductor windings.

13. The method of claim 11 further comprising coupling a capacitor to a second end of the center inductor winding.

14. The method of claim 12 further comprising coupling a rectification component to the first end of the first and second inductor windings.

15. The method of claim 14 wherein the rectification component is selected from the group consisting of:
   a synchronous rectifier, and
   a diode.

16. The method of claim 11 wherein forming the transformer includes wrapping a primary winding and a secondary winding around one of the plurality of legs of the transformer core.

17. The method of claim 11 wherein forming the inductor includes providing an air gap in the center leg thereof.

18. The method of claim 11 further comprising coupling at least one switching device to the transformer.

19. The method of claim 11 further comprising coupling a plurality of switching devices forming a full bridge topology to the transformer.

20. The method of claim 19 wherein the plurality of switching devices are configured to be controlled to produce a symmetrical quasi-square wave AC signal.

* * * * *